(12) United States Patent
Loce

(10) Patent No.: US 6,381,372 B1
(45) Date of Patent: Apr. 30, 2002

(54) SYSTEMS AND METHODS FOR DESIGNING IMAGE PROCESSING FILTERS USING TEMPLATES

(75) Inventor: Robert P. Loce, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/222,919

(22) Filed: Dec. 30, 1998

(51) Int. Cl.⁷ ................................................ H04N 1/40

(52) U.S. Cl. ...................................... 382/261; 382/266

(58) Field of Search .................................. 382/260–269

(56) References Cited

U.S. PATENT DOCUMENTS

| | | | |
|---|---|---|---|
| 4,437,122 A | 3/1984 | Walsh et al. | 358/166 |
| 4,630,125 A | 12/1986 | Roetling | 358/280 |
| 5,027,078 A | 6/1991 | Fan | 358/456 |
| 5,226,094 A | 7/1993 | Eschbach | 382/42 |
| 5,237,646 A | 8/1993 | Bunce | 395/117 |
| 5,274,472 A | 12/1993 | Williams | 358/455 |
| 5,325,216 A | 6/1994 | Auyeung | 358/479 |
| 5,353,127 A | 10/1994 | Shiau et al. | 358/456 |
| 5,359,423 A * | 10/1994 | Loce | 358/296 |
| 5,471,320 A * | 11/1995 | Jodoin et al. | 358/455 |
| 5,493,419 A * | 2/1996 | Jodoin et al. | 358/455 |
| 5,506,699 A | 4/1996 | Wong | 382/270 |
| 5,521,989 A | 5/1996 | Fan | 382/270 |
| 5,528,384 A | 6/1996 | Metcalfe et al. | 358/447 |
| 5,659,634 A | 8/1997 | Yeh et al. | 382/232 |
| 5,666,470 A | 9/1997 | Parker | 395/106 |
| 5,689,343 A * | 11/1997 | Loce et al. | 358/298 |
| 5,724,455 A | 3/1998 | Eschbach | 382/260 |
| 5,758,034 A | 5/1998 | Loce et al. | 395/102 |
| 5,768,432 A | 6/1998 | Schweid | 382/237 |
| 5,809,177 A | 9/1998 | Metcalfe et al. | 382/251 |

OTHER PUBLICATIONS

M. Analoui et al., "New Results on Reconstruction of Continuous–Tone from Halftone", Proceedings ICASSP (International Conference on Acoustics, Speech and Signal Processing), pp. 313–316, 1992.

Z. Fan, "Retrieval of Images from Digital Halftones," Proceedings of the International Symposium on Circuits and Systems, pp. 2477–2480, 1992.

S. Floyd et al., "An Adaptive Algorithm for Spatial Gray-scale", SID (Society for Information Display), pp. 75–77, vol. 17 No. 2 Second Quarter, 1976.

S. Hein et al., "Reconstruction of Continuous Tone Images from Their Error–Diffused Versions", Proceedings of the Conference on Human Vision, Visual Processing and Digital Display IV, pp. 310–324, (SPIE) vol. 1913, 1993.

C. Miceli et al., "Inverse Halftoning", Journal of Electronic Imaging, pp. 143–151, vol. 1(2), Apr. 1992.

A. N. Netravali et al., "Display of Dithered Images", SID (Society for Information Display) 1980 International Symposium, pp. 185–190, vol. 22 No. 3, 1981.

(List continued on next page.)

Primary Examiner—Thomas D. Lee
Assistant Examiner—Stephen Brinich
(74) Attorney, Agent, or Firm—Oliff & Berridge, PLC

(57) ABSTRACT

Image conversion systems and methods optimally perform filter design. The filter design allows for template-based image processing filters to be optimized to criteria based on visual perception. Different weights may be assigned based on different pixel errors. Possible weighting schemes in accordance with the systems and methods of the invention include a function of the distance to ideal pixels and a function of the value of neighboring pixels. The method provides better image quality. The method is useful for resolution enhancement and image restoration in particular.

21 Claims, 6 Drawing Sheets

OTHER PUBLICATIONS

S. M. Schweisser, "A Bayesian Approach to Inverse Halftoning", Proceedings of the Conference on Human Vision, Visual Processing, and Digital Display IV, pp. 282–292, vol. 1913, Feb. 1993.

M. Y. Ting, "Error–Diffused Image Compression Using a Binary–to–Gray–Scale Decoder and Predictive Pruned Tree–Structured Vector Quantization", IEEE Transactions on Image Processing, vol. 3, No. 6, pp. 854–858, Nov. 1994.

Robert P. Loce et al., "Optimal Morphological Restoration: The Morphological Filter Mean–Absolute–Error Theorem," Journal of Visual Communication and Image Representation, vol. 3, No. 4, pp. 412–432 (Dec. 1992).

E. R. Dougherty et al., "Optimal Mean–Absolute–Error Hit–or–Miss Filters: Morphological Representation and Estimation of the Binary Conditional Expectation," SPIE Journal of Optical Engineering, vol. 32, No. 4, pp. 815–827, Apr. 1993.

Paul G. Roetling et al., "Digital Image Processing Methods: Digital Halftoning(10)", Marcel Dekker, Inc. pp. 363–413 (1994).

Robert P. Loce, et al., "Enhancement and Restoration of Digital Documents: Statistical Design of Nonlinear Algorithms", SPIE—The International Society for Optical Engineering, pp. 1–50 and 102–125 (1997).

* cited by examiner

IDEAL EDGE

RAGGED EDGE

DIFFERENCE MODEL

RAGGED EDGE

DIFFERENCE MODEL

OBSERVED IMAGE
(JAGGED SECTION OF LINE)

OBSERVED IMAGE
(ENHANCED SECTION OF LINE)

NEIGHBORHOOD MASK

SYSTEMS AND METHODS FOR DESIGNING IMAGE PROCESSING FILTERS USING TEMPLATES

BACKGROUND OF THE INVENTION

1. Field of Invention

This invention relates to systems and methods for processing images using filters. More specifically, this invention relates to systems and methods for designing image processing filters using templates with optimality criterion based on aspects of human visual perception.

2. Description of Related Art

A wide variety of digital document processing tasks are performed using template-based filters. Illustratively, digital document processing tasks include resolution conversion, enhancement, restoration, appearance tuning and de-screening of images. These tasks are commonly performed on monochrome and color images, as well as binary and continuous tone images. A continuous tone image may also be referred to as a grayscale image.

In conventional systems and methods, a typical filter includes template operators to perform filtering of the images. That is, a filter may be characterized as an operator or device that transforms one image into another image. The filter is formed of a number of imaging template operators or templates. These templates may be, for example, stored in a look-up table. The number of templates in a filter may vary between a small number of templates to thousands of templates. Accordingly, a look-up table is typically used to implement a filter.

A raster is a one-dimensional array of image data, reflecting a single line of data across a single dimension, i.e., the length or the width, of the image. Further, each location in an image may be called a pixel. In an array defining an image in which each item of data provides a value, each value indicating the properties of a location may be called a pixel value. Each pixel value is a bit in a binary form of an image, a grayscale value in a grayscale form of an image, or a set of color spaced coordinates in a color coordinate form of an image. The binary form, grayscale form, and color coordinate form are each arranged in a two-dimensional array, which defines an image.

The filter, using the templates, transforms certain observed pixel patterns in a binary image, for example, into a corresponding enhanced binary pixel pattern, for example. Specifically, the filter observes an arrangement of pixels using a suitable window or mask. A window is an imaging component that observes a plurality of pixels at the same time and inputs properties of the observed pixels. After observing the arrangement of pixels, the filter then attempts to match the observed pixel pattern with one of the templates in the look-up table. If the look-up table contains a match to the observed pixel pattern, the look-up table generates an appropriate output. The output may be an enhanced pixel pattern that corresponds to the observed pixel pattern.

A wide variety of types and sizes of observation windows or masks are known. The particular window used in a particular application depends on the image to be analyzed and the particular process to be performed on the image. Illustratively, a 3×3 window may be used to process an image. The 3×3 window, at various locations in the image, observes a 3×3 block, i.e., a 9-pixel block, of binary-valued pixels, for example. One pixel in the window is the target pixel, which is typically the center pixel, while the other pixels in the window are the neighboring pixels. The target pixel and the neighboring pixels result in a neighborhood. The window is typically scanned across an image advancing from target pixel to target pixel.

After the neighborhood is observed in the window, the neighborhood is then processed in some manner. For example, the observed neighborhood may be transformed into a vector. The vector is expressed in the form of ($A_1$, $A_2$ ... $A_n$) and is used to represent the properties of the target pixel, including the neighborhood of the target pixel. Each element of the vector represents one of the pixels observed in the window. The vector is then used in the look-up table to generate a desired output, for example.

A look-up table may be created in a wide variety of ways. Typically, an input value is input into the look-up table and, in response, the look-up table outputs an output value. Further, the look-up table is typically created using a training image or a set of training images. *Restoration and Enhancement of Digital Documents*, by R. Loce and E. Dougherty, teaches a variety of methods for designing templates based on sets of training images. The training image will occur in pairs, where one member is the "typically input image," or the "typically observed image," i.e., the "observed image," and the other image is the "ideal desired processed version of the image," i.e., the "ideal image." The training image pairs may be input into a computer program that acquires and analyzes pattern statistics between the two images, i.e., using computer-aided filter design techniques.

Conventional computer-aided filter design may be accomplished through using training-sets of document bitmaps, for example. A bitmap is a binary digital image whose pixels possess values of 0 or 1. Alternatively, conventional computer-aided filter design may be accomplished through the use of training-sets of a binary half-toned image and a grayscale image. Specifically, one member of a set of training images is a binary half-toned image, and the other member is the original grayscale, i.e., the original image used to generate the binary halftoned image. In this case, the "typically observed image" is the halftone image, and the ideal output of a de-screening filter would be the original gray-scale image.

Illustratively, for a given pattern that occurs in the binary image about a target pixel, a training analysis systelm examines a target pixel at that corresponding location in the gray-scale image. The center of the window may be placed at the target pixel, for example. Based on the set of grayscale pixels associated with corresponding target pixel in the grayscale image, a "best grayscale pixel value" is determined for the target pixel. In other words, a template is created for the target pixel in the binary image. This analysis is performed for all binary patterns that are significant.

In this process of template selection, significance may be due to either the pixel pattern's frequency of occurrence, the pattern's effect on the generated image, or both. Accordingly, if a template, i.e., a pattern of pixels in the binary image, is observed and considered significant, the observed target pixel value will be assigned or associated with a certain value, i.e., a corresponding grayscale value. Both the observed value and the corresponding grayscale value are stored in the look-up table. Accordingly, the look-up table accepts an input value and outputs a desired corresponding output value, i.e., maps an input value to a desired corresponding output value.

However, it should be apparent that this input/output process may be performed in various other ways without using a look-up table. One alternative approach that is equivalent to using a look-up table representation is a Boolean logic representation. In the Boolean logic representation, pixel values are used as variables in the logic architecture, such as a logical sum of products. The goal of template filter design using Boolean logic representation is to derive statistically-optimized Boolean operators.

SUMMARY OF THE INVENTION

Filter design is conventionally performed using a wide variety of techniques. Thus, designing filters for processing images can be performed using statistical optimization techniques or expert knowledge. In filter design, as described above, a pair of training images is used, where one member of the training pair is the typically "observed image," and the other is the "the ideal image." The object of filter design is to map the "observed image" to a desired "generated image." Depending on the sophistication of the filtering process, the generated image will more or less correspond to the ideal image. If the filtering process is very sophisticated, the generated image will correspond almost exactly to the ideal image. However, various constraints, such as cost, typically limit the sophistication of the filtering process.

Illustratively, FIG. 1 is a diagram illustrating a conventional technique for designing and using a template-based filter. The method may be directed to image tuning or appearance tuning, for example. The term appearance tuning refers to a lightening or darkening, i.e., density control, of a pixel in conjunction with the repositioning of the pixel relative to one or more neighborhood pixels.

FIG. 1 depicts an observed image 102, an ideal image 104, a template 106, and a generated image 108. The observed image 102 and the ideal image 104 represent, for example, a typical before and after set of images, respectively. In other words, the observed image 102 and the ideal image 104 are training images. The observed image 102 and the ideal image 104 may be actual images that are selected based on expert knowledge.

The observed image 102 and the ideal image 104 may be bitmaps, for example. In accordance with the conventional method for designing a filter, and the templates within the filter, the design method tries to map as accurately as possible the observed image 102 to an image that accurately correspond to the ideal image 104, given certain constraints, such as a limited number of templates. That is, the technique attempts to convert or transform the observed image 102 to the ideal image 104.

To further explain, the observed image 102 could be ideally converted or processed to an image identical to the ideal image 104 using an extensive set of templates and/or expert knowledge. Such a conversion would result in the best possible bitmap, which would correspond to the ideal image 104. However, it is typically not possible or desirable to use such an extensive set of templates in a filter. This is a result of constraints, such as memory capability and cost. Further, it should be recognized that it is simply not necessary to transform the observed image 102 to an image that exactly corresponds to the ideal image 104. That is, the human visual perception has shortcomings. Specifically, the human visual perception only detects certain components and aspects of a given image. Accordingly, while the ideal image 104 is the best possible corresponding representation of the observed image 102, this best possible representation may not be required, and probably is not required.

As shown in FIG. 1, in accord with this illustrative example, the generated image 108 is generated using the template 106. The generated image 108 may be generated without using an excessive number of templates or expert knowledge, depending on the requisite quality of the generated image 108. Further, optimally, generating the generated image 108 should minimize the generating cost, for example. Specifically, the generated image 108 only corresponds to the ideal image 104 in an optimized manner that focuses on details of the image that the human visual perception will actually detect.

In filter design processes, i.e., constructing a filter for subsequent use in other devices, for example, the typical method attempts to identify pixels or pixel patterns that are different between the generated image 106 and the ideal image 104. As more pixels are different, the pixel count difference between the generated image 106 and the ideal image 104 will increase. The templates that are chosen for inclusion in the filter 106 are those templates that minimize the pixel count difference between the generated image 108 and the ideal image 104. For example, the resolution of a document may be expressed in the form of spots per inch (spi). Further, it may be desirable or necessary to convert a 240 spi document bitmap to a 600 spi document bitmap, i.e., a document having greater resolution. A good filter is one that yields the generated image with the least possible number of pixels different from an ideal 600 spi bitmap, i.e., with the lowest pixel count difference.

Using conventional techniques, each of the difference pixels are considered equally. From the point of view of the systems and methods of this invention, the pixels conventionally are accorded equal weighting when computing the difference between the ideal and the filter generated image. The pixels are, in the sense of the systems and methods of this invention, all given a weighting of 1. As a result, the difference pixels are not analyzed in an optimum manner.

Accordingly, when various tasks such as resolution conversion, resolution enhancement, restoration, appearance tuning and de-screening are performed on grayscale or binary images, a template-based filter is often applied to the original image to convert it to a corresponding generated image. However, a shortcoming of conventionally designed template-based image processing filters is that the filters are not optimized relevant to a visual criterion. That is, conventional filters are not optimized with regard to the human visual perception. To explain, a "degradation" in an image may be characterized as a pixel or group of pixels that adversely impact the quality of an image. Illustratively, the human eye is more sensitive to degradation along the vertical and horizontal axes, than along an axis 45° to the vertical, i.e., an angled axis. Accordingly, these sensitivities of the human eye should be considered in an efficient manner, when designing a template-based filter. However, conventional design of template-based filters does not take into account the visual perception in an optimal manner.

Accordingly, this invention provides systems and methods that optimize template-based filter design in a manner that is relevant to the human visual system.

This invention provides systems and methods that optimize template-based filter design in a manner that is relevant to printing or other output in a particular operating environment.

This invention separately provides systems and methods that provide an improved technique to reduce the size of a template set to improve the cost efficiency of template-based filters.

This invention separately provides systems and methods that provide an optimized design for template-image processing filters for applications such as resolution conversion, resolution enhancement, image restoration, and the like.

This invention separately provides systems and methods that may be used in conjunction with known methods for resolution conversion, resolution enhancement, image restoration, and the like.

This invention separately provides systems and methods that may be used in conjunction with known filter design techniques to optimally yield images possessing better visual quality.

In one exemplary embodiment of the systems and methods of the invention, a template-based filter is designed by appropriately weighting pixels that are different between an image pair comprising an observed image and an ideal image. The difference pixels are weighted based on various factors associated with parameters of the image. The factors may be based on neighboring image structure in the observed image, the ideal image, or both.

In accordance with one embodiment, the systems and methods of the invention scan an observed image using an appropriate window. The window progresses from target pixel to target pixel in the observed image. At each target pixel, a windowed group of pixels is observed, i.e., a windowed neighborhood. Further, the pixels in the window are appropriately weighted based on the particular image being analyzed and the process to be performed on that image. In other words, the particular spatial location of a neighboring pixel in the windowed neighborhood will effect the weight that the properties of that neighboring pixel are accorded.

Further, in accordance with an embodiment of the systems and methods of the invention, all the weights associated with a selected target pixel in an observed image are summed, i.e., totaled. If the sum of the weights for the selected target pixel exceeds a predetermined threshold value, then the pixel pattern associated with that target pixel is, for example, chosen to be included in a look-up table. Further, the corresponding pattern in the ideal image is associated with the selected pixel pattern in the observed image. As a result, look-up table may be generated and subsequently used to convert an observed image to a generated image. The generated image corresponds to the ideal image, which was used in the creation of the look-up table, i.e., the creation of the template-based filter.

In this manner, the systems and methods of the invention attempt to minimize the sum of the weights associated with difference pixels between an observed image and an ideal image. As the sum of the weights decreases, the error associated with the conversion from an observed image to a generated image, which corresponds to an ideal image, also decreases. Illustratively, if the sum of the weights associated with the difference pixels were 0, then there would be no error associated with the conversion. That is, the generated image would exactly correspond to the ideal image upon implementation of the created look-up table.

Accordingly, the systems and methods of the invention recognize that some errors in a conversion process between an observed image and a generated image are more important than other errors. In accordance with the systems and methods of the invention, a weighting is assigned to various observed errors. The more important errors receive heavier weighting, while the less important errors receive a lighter weighting. Various criteria may be used to assign a specific weight value to an error.

A wide variety of weighting methods and techniques may be used in accordance with the invention based on the particular image or images to be filtered. One manner in which to assign appropriate weight is to determine which errors have a more visual impact than other errors. The errors which have a greater visual impact will receive a heavier weight. For example, an error which has a substantial visual impact associated with it may receive a weighting of 3. On the other hand, an error which has no or negligible visual impact associated with it may receive a weighting of 1, or even zero. Further, the threshold weighting of error may be predetermined to be 2. As a result, the template-based filter will be designed or created to contain a template to address the error with a weighting of 3, but not the error with a weighting of 1. Accordingly, the ultimate size of the created template-based filter is decreased, but the most important errors associated with the conversion from an observed image to a generated image are still addressed.

Accordingly, in some exemplary embodiments, the systems and methods of embodiments of the invention provide a method to decrease the cost of printer electronic hardware, for example, by designing a filter with a relatively small number of templates. The templates that are included in the filter will be provided based on only the most important potential errors. The templates chosen for the filter in accordance with the systems and methods of the invention modify the pixels with the most adverse visual impact.

These and other features and advantages of the systems and methods of this invention are described in or are apparent from the following detailed description of the exemplary embodiments.

BRIEF DESCRIPTION OF THE DRAWINGS

The exemplary embodiments of this invention will described in detail, with reference to the following figures, wherein.

DETAILED DESCRIPTION OF PREFERRED EMBODIMENTS

Figure 1:
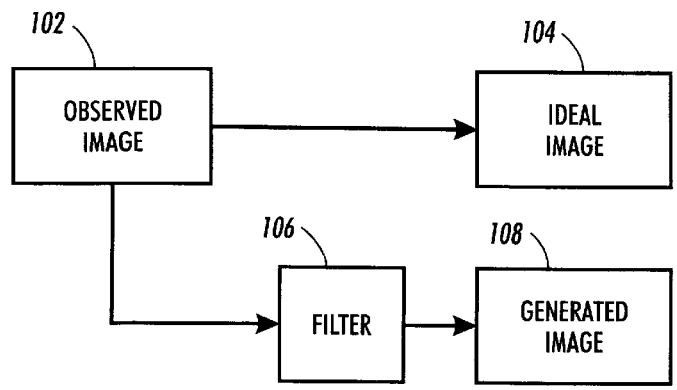
FIG. 1 is a diagram illustrating a conventional template-based filter design process.
Figure 2:
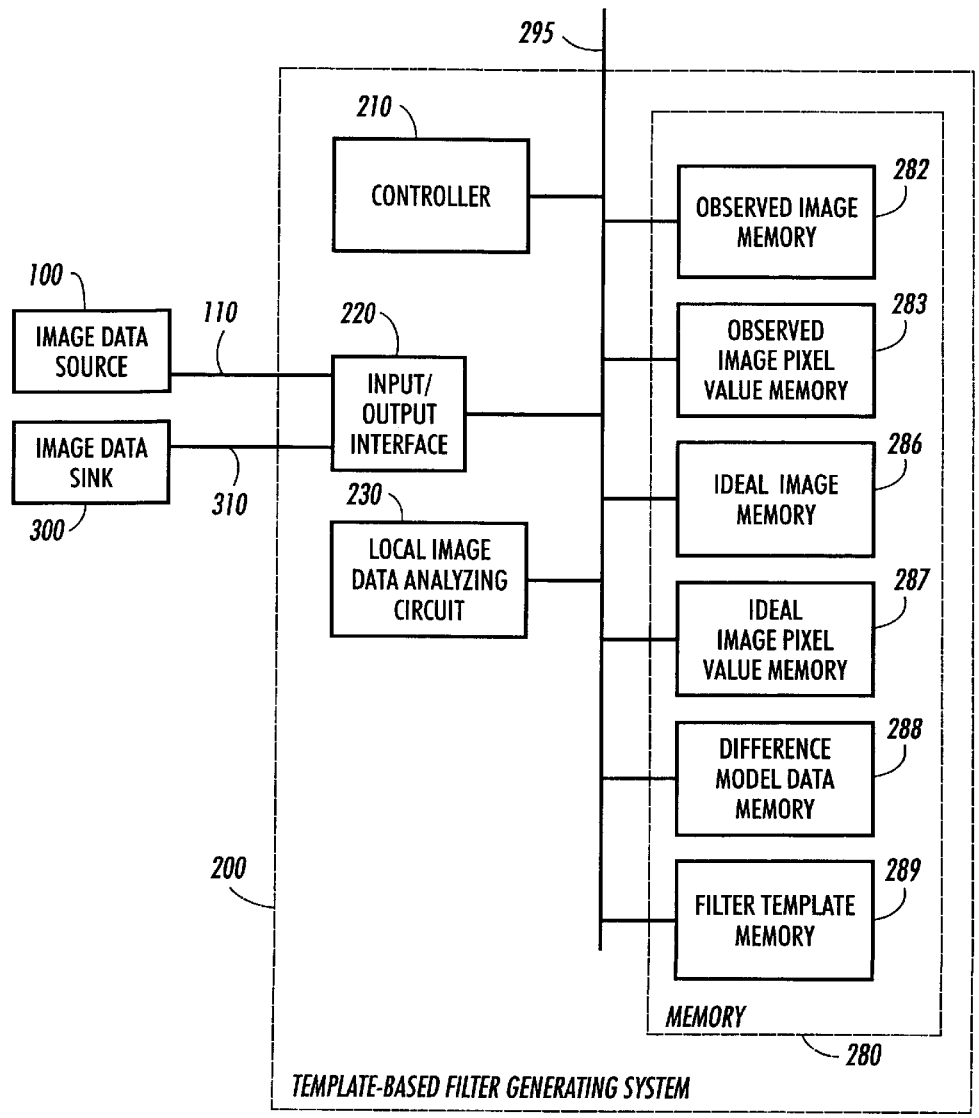
FIG. 2 is a functional block diagram of one exemplary embodiment of a template-based filter generation system in accordance with this invention.

FIG. 2 shows one exemplary embodiment of a generalized functional block diagram of a template-based filter generation system 200 according to this invention. The template-based filter generation system 200 is connected to an image data source 100 over a signal line or link 110 and to an image data sink 300 over a signal line or link 310. The image data source 100 provides a wide variety of image data to the template-based filter generation system 200. The image data sink 300 receives data output by the template-based filter generation system 200.

In general, the image data source 100 can be any one of a number of different sources, such as a scanner, a digital copier, a facsimile device or any known or later developed device that is suitable for generating electronic image data, or any known or later developed device suitable for storing and/or transmitting electronic image data, such as a client server of a network. Further, the image data source 100 does not necessarily have to be a single device, but rather may be formed by two or more separate devices.

Thus, the image data source 100 can be any known or later developed source that is capable of providing binary or grayscale image data, as well as monochrome or color data, to the template-based filter generation system 200 of this invention. Similarly, the image data sink 300 can be any known or later developed device that is capable of receiving the processed image data output by the template-based filter generation system 200 and either storing, transmitting, and/or displaying that processed image data. Thus, the image data sink 300 can be either or both of a channel device for transmitting image data, for example, for storage of the image data or a storage device for indefinitely storing the image data until there arises a need to further transmit the image data.

Further, the channel device can be any known structure or apparatus for transmitting the image data from the template-based filter generation system 200 to a physically remote storage or display device. Thus, the channel device can be a public switched telephone network, a local or wide area network, an intranet, the Internet, a wireless transmission channel, any other distributing network, or the like.

Similarly, the storage device can be any known structure or apparatus for indefinitely storing the image data, such as a RAM, a hard drive and disc, a floppy drive and disc, an optical drive and disc, a flash memory, or the like. Finally, the display device can be any known device for displaying or rendering an image. Thus, the display device can be a CRT, an active or passive matrix LCD, an active or passive LED display, a laser printer, an ink jet printer, a digital copier, or the like.

Moreover, the image data source 100 and the image data sink 300 can be physically remote from the template-based filter generation system 200 and reachable over the channel device and signal links 110 and 310 described above. Alternatively, the template-based filter generation system 200 can be integrated with either or both of the image data source 100 and the image data sink 300.

As shown in FIG. 2, the template-based filter generation system 200 includes a controller 210, an input/output. interface 220, a local image data analyzing circuit 230 and a memory 280, each of which is connected to a data bus 295. The input/output interface 220 is also connectable to the image data source 100 and the image data sink 300 over the signal lines or links 110 and 310, respectively.

Additionally, as shown in FIG. 2, the memory 280 includes an observed image memory 282, an observed image pixel value memory 283, an ideal image memory 286, an ideal image pixel value memory 287 and a difference model data memory 288. The observed image memory 282 stores observed image data or information from an observed image that has been input into the template-based filter generation system 200. This observed image data may be input from the image data source 100 through the input/output interface 220. The observed image pixel value memory 283 stores processed observed image data obtained from analysis of the input observed image, such as pixel value or pixel pattern information representing the input observed image. The processed observed image data stored in the observed image pixel value memory 283 may be in the form of representative vectors, for example.

The ideal image memory 286 stores ideal image data or information from an ideal image that has been input into the template-based filter generation system 200. This ideal image data may also be input from the image data source 100 through the input/output interface 220. The ideal image pixel value memory 287 stores processed ideal image data obtained from analyzing the input ideal image data, such as pixel value or pixel pattern information representing the ideal image data. The processed ideal image data stored in the ideal image pixel value memory 287 may be in the form of representative vectors, for example. The memory 280 also includes the difference model data memory 288. The difference model data memory 288 stores difference model data. The difference model data is generated and based on a comparison between the processed observed image data stored in the observed image pixel value memory 283 and the processed ideal image data stored in the ideal image pixel value memory 287. Further, the memory 280 includes the filter template memory 289. The filter template memory 289 stores template data generated by the template-based filter generation system 200 in accordance with the systems and methods of the invention.

The memory 280 also stores any necessary control programs and/or data required by the template-based filter generation system 200. Thus, the memory 280 can be implemented using any known or later developed alterable memory, such as static or dynamic RAM, a floppy disc and disc drive, a writeable optical disc and disc drive, a hard disc and disc drive, flash memory, or the like or any other volatile or non-volatile alterable memory. The memory 280 can also include any known or later developed fixed memory, such as, read only memory, including PROM, EPROM, EEPROM, a CD-ROM and disc drive, or the like.

Figure 3:
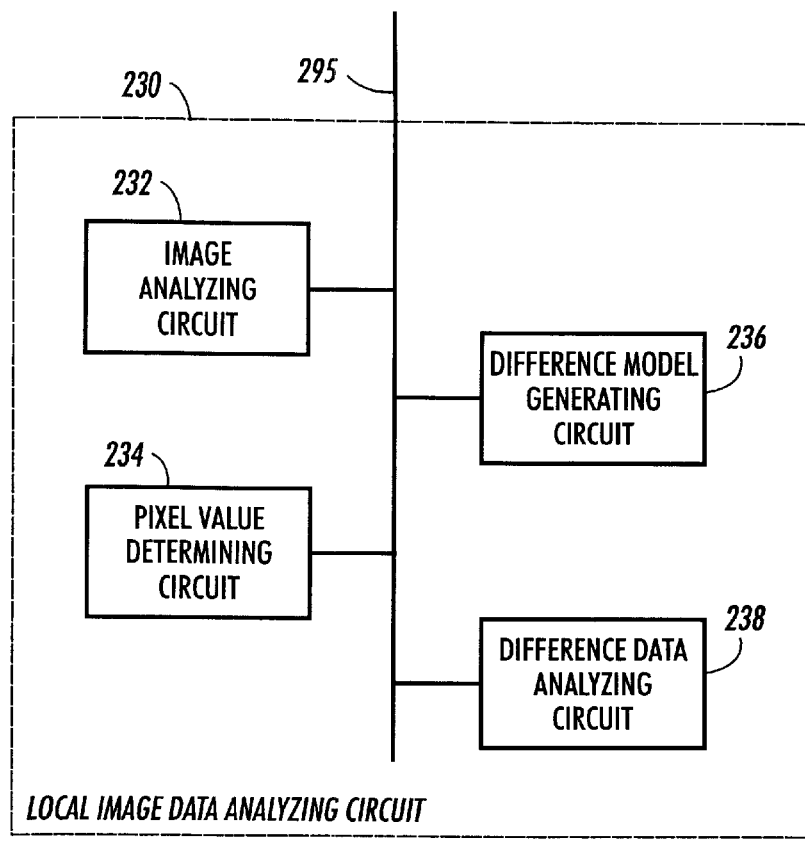
FIG. 3 shows in greater detail one exemplary embodiment of a functional block diagram of the local image data analyzing circuit of FIG. 2 in accordance with this invention.
Figure 4:
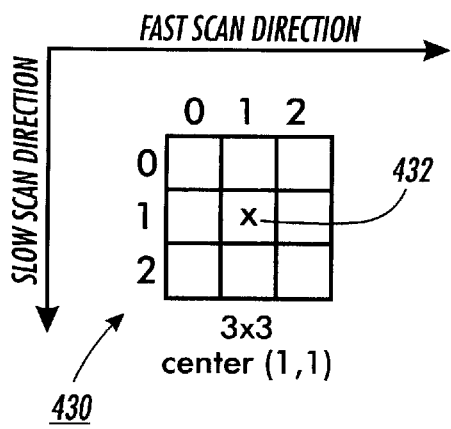
FIG. 4 is a diagram showing one exemplary window in accordance with the invention.

FIG. 3 shows in detail one exemplary embodiment of a functional block diagram of the local image data analyzing circuit 230 of FIG. 2. As shown in FIG. 3, the local image data analyzing circuit 230 includes an image analyzing circuit 232, a pixel value determining circuit 234, a difference model generating circuit 236, and a difference data analyzing circuit 238. The image analyzing circuit 232 performs the initial input and initial analysis of the input observed image. The image analyzing circuit 232 also performs the initial input and initial analysis of the input ideal image. Illustratively, the image analyzing circuit 232 may create a representative bitmap for each of the input images. The pixel value determining circuit 234 analyzes the observed image data and the ideal image data generated by the image analyzing circuit 232. Further, the pixel value determining circuit 234 represents this data in some appropriate manner, such as in the form of a vector. The image analyzing circuit 232 and the difference model generating circuit 236 may use a window, for example, to observe the images. An exemplary window is shown in FIG. 4.

The difference model generating circuit 236 in the local image data analyzing circuit 230 determines distinctions or differences between the observed image and the ideal image, based on the data generated by the pixel value determining circuit 234. As a result, the difference model generating circuit 236 outputs difference data. Finally, the difference data analyzing circuit 238 analyzes the difference data and selects templates based on the difference data. As a result, the difference data analyzing circuit 238 compiles an optimized filter comprised of optimally selected templates. In the exemplary embodiment described below, the templates are compiled in the form of a look-up table. However, it should be recognized that the resulting filter is not limited to a look-up table. Rather, the templates may be compiled to form a filter or a plurality of filters using any of a variety of known or later developed methods, including generating a Boolean logic circuit, for example.

In accordance with an exemplary learning process of the systems and methods of the invention, a pair of corresponding training images is initially selected. These training images may be selected based on expert knowledge. In accordance with this exemplary embodiment of the systems and methods of the invention, it is necessary or desirable to create a look-up table comprising templates that will perform an image restoration process in an optimal manner.

Figure 5:
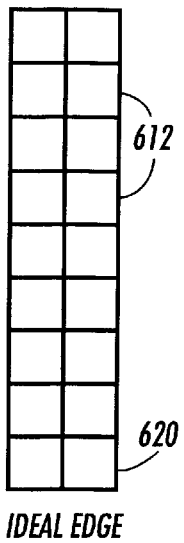
FIG. 5 is a diagram showing an ideal edge of an ideal image in accordance with this invention.
Figure 6:
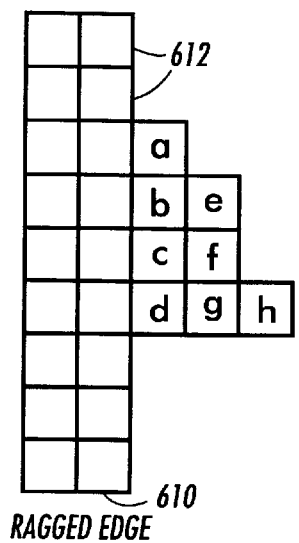
FIG. 6 is a diagram showing a ragged edge of an observed image in accordance with this invention.

Accordingly, a pair of training images is shown in FIGS. 5 and 6. Specifically, FIG. 5 is a diagram showing an ideal image 620 that includes an ideal edge. FIG. 6 is a diagram showing an observed image 610 that includes a ragged edge. Further, The ragged edge of the observed image 610 includes corrupted pixels, which have been labeled with lowercase letters, as shown in FIG. 6. In this exemplary embodiment, both the observed image 610 and the ideal image 620 are binary images. The pixels in a binary image may be either on or off, i.e., black (1) or white (0), respectively. As shown in FIGS. 5 and 6, the on pixels are represented by being boxed. The off pixels or white pixels are represented by the non-boxed areas, i.e., the open white page.

In accordance with the systems and methods of the invention, it should be recognized that ideal reference data may be in a variety of forms. That is, it is not necessary to use an ideal image. Rather, ideal reference data in other forms may also be used. Thus, the ideal reference data may be in the form of an ideal reference function, for example. The ideal reference function might represent the ideal image that is necessary or desirable to, achieve in converting an observed image. For example, an ideal reference function may be a function that represents image intensity or weighted error. Such a function might be evaluated using input values to get an output value, i.e., similar to indexing an image using a pixel location. Illustratively, a period function might be used to represent a period image. Thus, the actual ideal image is not needed. Rather, the systems and methods of the invention simply require information that represents a reference that is necessary or desirable to achieve.

To create a look-up table comprising templates that will perform an image restoration process in an optimal manner, the template-based filter generation system 200 selects and creates templates that will map the observed image 610 to the ideal image 620 in an optimal manner based on visual impact, for example. Accordingly, the controller 210 initiates the generation of an optimized template-based filter, compiled in the form of a look-up table. The image analyzing circuit 232 in the local image data analyzing circuit 230 inputs the observed image 610 from the image data source 100 through the link 110. The image analyzing circuit 232 analyzes the observed image 610 and stores the observed image data from the observed image 610 in the observed image memory 282 in some readable form, representing the observed image. Illustratively, the image analyzing circuit 232 may store the observed image 610 in the observed image memory 282 in the form of binary pixel patterns.

Then, the pixel value determining circuit 234 in the local image data analyzing circuit 230 analyzes the observed image. The pixel value determining circuit 234 analyzes the pixel patterns obtained from the observed image by the image analyzing circuit 232 and stored in the observed image memory 282. Specifically, the pixel value determining circuit 234 converts the observed pixel patterns to a vector, for example. This vector effectively represents the pixel pattern shown in FIG. 6 and stored in the observed image memory 282. After the pixel value determining circuit 234 determines, for each target pixel, the vector representing the observed image 610, this vector data and target pixel position data are stored in the observed image pixel value memory 283.

As described below, the pixel value determining circuit 234 uses a sliding window technique to analyze the observed image 610. The image analyzing circuit 232 may use a sliding window in a similar manner. Illustratively, a 3×3 sliding window may be used by the pixel value determining circuit 234. The pixel value determining circuit 234 scans the sliding 3×3 window across the image data of the image data stored in the observed image memory 282, for example.

FIG. 4 shows one illustrative example of such a 3×3 sliding window. As shown in FIG. 4, a sliding window 430 includes an array of pixels including 3 rows, with vertical coordinates 0–2, respectively, and three columns, with horizontal coordinates 0–2, respectively. The horizontal axis represents the fast scan direction, while the vertical axis represents particular pixels in the slow scan direction. The sliding window includes a target pixel 432. For example, the sliding 3×3 window 430 includes a center target pixel 432 located at the coordinates (1,1). The target pixel 432 is used to analyze the observed image and the ideal image.

The pixel value determining circuit 234 scans the sliding window 430 across the pixels of the image to be analyzed. Specifically, using the sliding window 430, for example, the pixel value determining circuit 234 observes all the pixels in the observed image. As the sliding window 430 scans across the pixels of the observed image, information will be generated for the target pixel at a given time. As a result, information generated for the target pixel will depend not only on the particular image value of the target pixel for which information is generated, but will also depend upon the image value of the pixels in the neighborhood of the target pixel.

The pixel value determining circuit 234 scans the window 430 along the fast-scan direction. Specifically, the pixel value determining circuit 234 inputs the pixel information starting at an arbitrary first target pixel. The pixel value determining circuit 234 observes the first target pixel's neighborhood. The observed pattern information is stored in the observed image pixel value memory 283 in the form of a vector. The pixel value determining circuit 234 then moves the window to a second target pixel neighborhood. In a manner similar to the observation of the neighborhood of the first target pixel, the pixel value determining circuit 234 observes the neighborhood of the second target pixel. The observed pattern information is stored in the observed image pixel value memory 283 in the form of a vector. Then, the pixel value determining circuit 234 moves the window to a third target pixel, a fourth target pixel, and so forth until the entire image has been input.

Eventually, the last target pixel's neighborhood will be observed. As a result, target pixel pattern information for each target pixel will be stored in the observed image pixel value memory 283. Specifically, in accordance with the training process of the template-based filter generation system 200, the pixel value determining circuit 234 generates processed observed image data indicative of the specific pattern distribution for each observed target pixel in the observed image. This pattern data, along with the coordinates of the associated target pixels, is stored in the observed image pixel value memory 283.

It should be recognized that various other types of windows of different shapes, sizes and properties may be used in conjunction with embodiments of the systems and methods of the invention. It should be recognized that the particular sliding window used in any particular embodiment of the systems and methods according to this invention will depend on the particular requirements of the application.

The template-based filter generation system 200 analyzes the ideal image 620 shown in FIG. 5 in a manner similar to the manner in which the observed image 610 was analyzed. The template-based filter generation system 200 inputs the ideal image 620 shown in FIG. 5. Specifically, the image analyzing circuit 232 in the local image data analyzing circuit 230 inputs the ideal image 620 from the image data source 100 through the link 110. The image analyzing circuit 232 analyzes the ideal image 620 and stores the observed image data, which represents the ideal image, from the ideal image 620 in the ideal image memory 286 in some readable form. Illustratively, the image analyzing circuit 232 may store the ideal image 620 in the ideal image memory 286 in the form of a pixel pattern.

Then, the pixel value determining circuit 234 analyzes the ideal image. The pixel value determining circuit 234 observes the pixel patterns in the ideal image stored in the ideal image memory 286. Further, the pixel value determining circuit 234 analyzes the pixel patterns stored in the ideal image memory 286. Specifically, the pixel value determining circuit 234 converts the ideal pixel patterns to respective vectors, for example. These vectors effectively represent the ideal image pixel pattern shown in FIG. 5 and stored in the ideal image memory 286. After the pixel value determining circuit 234 determines, for each target pixel in the ideal image, the vector representing the ideal image 620, this vector data and target pixel position data are stored in the ideal image pixel value memory 287.

Accordingly, the pixel value determining circuit 234 stores processed observed image data in the observed image pixel value memory 283 and stores processed ideal image data in the ideal image pixel value memory 287 in the form of vectors. However, it should be recognized that the systems and methods of the invention are not limited to representing the image data in the form of vectors. Rather, the image data may be represented in any suitable manner to effectively represent the observed and ideal pixel patterns.

The difference model generating circuit 236 analyzes and compares the processed observed image data stored in the observed image pixel value memory 283 and the processed ideal image data stored in the ideal image pixel value memory 287. The observed and ideal images 610 and 620 are binary images represented by 1s and 0s. Each of the boxes or blocks shown in FIGS. 5 and 6 correspond to 1s.

Further, the white open page, which is not boxed, corresponds to 0s. The difference model generating circuit 236 essentially subtracts the observed image 610 from the ideal image 620. The difference model generating circuit 236 performs this subtraction process using any one of a variety of conventional image processing techniques.

Figure 7:
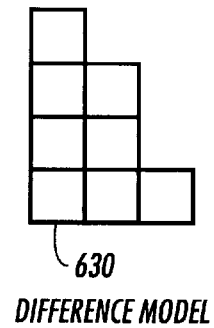
FIG. 7 is a diagram showing a difference model generated based on difference pixels between FIGS. 5 and 6 in accordance with this invention.

The difference data analyzing circuit 238 performs the subtraction process and as a result generates a difference model, as shown in FIG. 7. The difference model shown in FIG. 7 includes a difference pixel pattern image 630. The difference pixel pattern image 630 represents the difference pixels between the observed image 610 and the ideal image 620. Accordingly, the difference pixel pattern image 630 is an image that that effectively represents degradations of the observed image 610 vis-à-vis the ideal image 620.

In accordance with the systems and methods of the invention, the difference data analyzing circuit 238 analyzes the difference pixel pattern image 630 in a manner to optimally select templates for a filter. One criterion that the difference data analyzing circuit 238 may use to analyze the difference pixel pattern image 630 is based on visual perception. In particular, the human visual system is very sensitive to a black projection from a straight line, i.e., an ideal image structure, as shown in FIG. 6. The further the projection extends from the ideal image structure, the more quickly the human eye will detect the degradation.

As a result, it is typically more desirable to eliminate degraded pixels that extend further from an ideal image structure. As a result, a simple distance function may be used as the weighting function in accordance with one exemplary embodiment of the systems and methods of the invention. Specifically, the difference data analyzing circuit 238 analyzes each difference pixel in the difference pixel pattern image 630 based on the distance that the pixel is from an ideal edge 612, as shown in FIGS. 5 and 6. For example, the weighting function could be a power function of the distance that the pixel in the difference model is from the ideal edge 612, represented as:

$$w=d^n$$

where:

w is the weight accorded to the pixel;

d is the distance that the pixel is from the ideal edge 612; and n is a power that is found to be suitable for the given application.

Illustratively, a suitable power for n may be "2." Accordingly, for n=2:

$$w(a)=w(b)=w(c)=w(d)=1;$$

$$w(e)=w(f)=w(g)=4;$$

and $$w(h)=9$$

Based on the weighting function, the difference data analyzing circuit 238 treats all the h-type pixel errors, as shown in FIG. 6, as 9 times more important than an a-type pixel error, as shown in FIG. 6. In this exemplary embodiment, the difference data analyzing circuit 238 uses a weight threshold of 5, for example. That is, if the observed pixels do not generate a weight of greater than 5, then a template to correct that observed pixel or set of pixels will not be included in the filter. Further, the generated "weight" may also be characterized as the weight that a given template modifies. Accordingly, with reference to the h-type pixel that has an associated weight of 9, the difference data analyzing circuit 238 will generate a template to correct the h-type error.

To generate the template, the difference data analyzing circuit 238 retrieves the observed image pixel pattern that is stored in the observed image memory 282 for the h-pixel. The difference data analyzing circuit 238 stores this pixel pattern as a first of two associated pixel patterns in the filter template memory 289. Then, the difference data analyzing circuit 238 retrieves the ideal image pixel pattern that is stored in the ideal image memory 286 for the h-pixel. In this example and with reference to FIG. 6, the h-pixel in the ideal image is a 0-valued pixel. The difference data analyzing circuit 238 stores this ideal image pixel pattern in the filter template memory 289 as the second pixel pattern, and associates the observed image pixel pattern with the ideal image pixel pattern. As a result, a template is formed. One or more templates go to make up a filter and result in a template-based filter.

The associated pixel patterns of a template-based filter, according to this exemplary embodiment of the systems and methods of the template-based filter generation system 200 of this invention, are stored in the form of a look-up table. Thus, when the look-up table is ultimately completed and implemented in a device, if a pixel pattern of the h-type is input into the look-up table, the look-up table will output a 0-valued pixel, for example.

Further, it should be recognized that using the systems and methods of the template-based filter generation system 200 of the invention, only 1 template is needed to effectively deal with the degradation of the image data shown in FIG. 6. In contrast, using conventional techniques, 8 templates would have been required to deal with the degradation of the image data shown in FIG. 6. That is, using conventional techniques, a respective template for each degraded pixel could have been required.

Further, the difference data analyzing circuit 238 may also consider the frequency of occurrence of an error based on a predetermined protocol. For example, assuming the weighting is based on the relationship w=d$^n$, the protocol may be based on the relationship $$W_f = f^* w;$$

where:

W$_f$ is the collective weighting of all the occurrences of the h-type error, for example;

f is the frequency of occurrence of the h-type error; and w is the weight accorded to the h-type error, as described above.

Further, the difference data analyzing circuit 238 uses a predetermined threshold T$_w$. For example, T$_w$=2000. The h-type error is assigned a weight of 9. If the h-type error occurs in a difference pixel pattern image 300 times, i.e., if f=300, then the difference data analyzing circuit 238 will create a template to cure the h-type error. That is, the threshold:

$$T_w = (2000) < 9^*300 = (2700).$$

Further, it should be recognized that the specific manner in which the difference data analyzing circuit 238 utilizes the weights may vary between applications. Illustratively, the difference data analyzing circuit 238 may use the weight of each degraded pixel individually, as described above. Alternatively, the difference data analyzing circuit 238 may use the weight of "neighboring degraded pixels" collectively.

With regard to the collective use, as described above with reference to FIG. 7, the weighting may be based on the relationship w=d$^n$. Accordingly, as described above, for n=2:

$$w(a)=w(b)=w(c)=w(d)=1;$$

$$w(e)=w(f)=w(g)=4;$$

and $$w(h)=9.$$

The difference data analyzing circuit 238 may collectively use the weighting of pixels based on certain criteria or protocol. For example, for a selected target pixel, the difference data analyzing circuit 238 may sum all the weights of degraded pixels that are connected to the target, pixel, or that are connected to degraded pixels that are connected to the target pixel. As a result of this protocol, if the target pixel is the a-pixel as shown in FIG. 6, the difference data analyzing circuit 238 will sum the weighting of each of the degraded pixels a–h together. That is:

$$W_c = \sum_{i=a}^{h} w_i$$

where W$_c$ is the collective weight. Thus, the target a-pixel will be assigned a collective weighting of 25, i.e., W$_c$=25 based on:

$$W_c = \sum_{i=a}^{h} w_i = 1(9) + 3(4) + 4(1) = 25$$

An appropriate window, such as a 5×5 window, may be used by the difference data analyzing circuit 238 for this application. Analyzing each of the pixels b–h will result in the same weighting of 25 since the pixels a–h are all connected. Further, for example, the difference data analyzing circuit 238 can use a threshold of 20. Thus, if a degraded pixel is assigned a weight greater than 20, the difference data analyzing circuit 238 creates a template to remedy that degraded pixel. Since all the pixels in this example will receive the same weighting of 25, then all the pixels will be identified by the difference data analyzing circuit 238 as being degraded by an extent to justify a template to correct the error associated with that pixel.

To generate a template for the degraded a-pixel, the difference data analyzing circuit 238 retrieves the observed image pixel pattern that is stored in the observed image memory 282 for the a-pixel. The difference data analyzing circuit 238 stores this pixel pattern as a first of two associated pixel patterns in the filter template memory 289. Then, the difference data analyzing circuit 238 retrieves the ideal image pixel pattern that is stored in the ideal image memory 286 for the a-pixel. The difference data analyzing circuit 238 stores this ideal image pixel pattern in the filter template memory 289 as the second pixel pattern, and associates the observed image pixel pattern with the ideal image pixel pattern. As a result, a template is formed for the a pixel. The template may be included in the created look-up table. A template is similarly formed for each the pixels b–h.

As should be apparent, in this example, using the collective weighting will result in the difference data analyzing circuit 238 generating 8 templates. While this may be viewed as an excessive number, such template generation may be desirable or necessary in some applications. Further, after analysis of the a-pixel, the difference data analyzing circuit 238 may have intelligence to recognize that each of the degraded pixels b–h have also been analyzed so that redundant templates would not be created when the b pixel, for example is selected as a target pixel. That is, after analysis of the a-pixel, the pixels b–h would not subsequently be selected as a target pixel, but rather would be passed over in the scanning process.

Further, the individual weighting and the collective weighting may be used in conjunction with each other, as well as in conjunction with the frequency of occurrence of the error. For example, the difference data analyzing circuit 238 may select the a-pixel as the target pixel. The protocol to analyze the a-pixel may use the relationship:

$$W_a = w * W_c$$

where:

$W_a$ is the adjusted weight;

w is the weight accorded to the individual a-pixel, determined as described above; and $W_c$ is the collective weight of all the adjacent degraded pixels, determined as described above.

Based on this relationship, the difference data analyzing circuit 238 will create a template to correct an observed error, for example, if the individual weighted error w is very high and $W_c$ is low; if the individual weighted error w is low and $W_c$ is very high; or if the individual weighted error w is moderately high and $W_c$ is also moderately high.

The degradation in the form of the protrusion shown in FIG. 6 may be characterized as positive noise.. Noise is a term typically used to denote random degraded pixels. Since the noise results in a black ragged protrusion, the noise shown in FIG. 6 may be characterized as positive or additive noise. In contrast, a white ragged intrusion may be characterized as negative noise. If the difference data analyzing circuit 238 detects negative noise, the difference data analyzing circuit 238 may utilize a function of the distance to an ideal white pixel as the weight.

Figure 8:
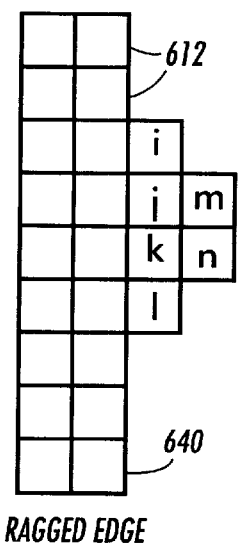
FIG. 8 is a diagram showing a ragged edge of an observed image in accordance with this invention.
Figure 9:
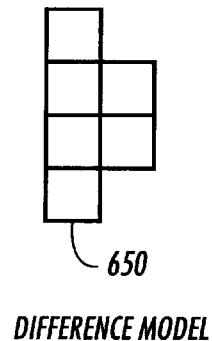
FIG. 9 is a diagram showing a difference model generated based on difference pixels between FIGS. 5 and 8 in accordance with this invention.

FIGS. 8 and 9 illustrate the application of the template-based filter generation system 200 on a different image. An observed image 640 with a ragged edge is shown in FIG. 8. The ideal image that corresponds to the observed image 640 is the ideal image 620 shown in FIG. 5, as described above. The difference model generating circuit 236 performs a subtraction process, as described in conjunction with FIG. 7 above. As a result, the difference model generating circuit 236 generates a difference model shown in FIG. 9. The difference model shown in FIG. 9 includes a difference pixel pattern image 650. The difference pixel pattern image 650 represents the difference pixels between the observed image 640 and the ideal image 620, shown in FIG. 5. Accordingly, the difference pixel pattern image 650 is an image that effectively represents degradations of the observed image 640 vis-à-vis the ideal image 620.

Further, the difference data analyzing circuit 238 analyzes each pixel in the i–n difference pixel pattern image 650 based on the distance that the pixel is from an ideal edge 612, as shown in FIGS. 6 and 8. As described above, the weighting is a power of the distance that the pixel is from the ideal edge 612, represented as $w=d^n$. If n=2, then:

$$w(i) = w(j) = w(k) = w(l) = 1;$$

and $$w(m) = w(n) = 4.$$

In this exemplary embodiment, the difference data analyzing circuit 238 also uses a weight threshold of 5, for example. That is, if an observed pixel does not generate a weight of greater than 5, then a template to correct that observed pixel will not be included in the filter. Accordingly, with reference to pixels i–n of FIGS. 8 and 9, no observed pixels possess a weighting that exceeds the threshold. As a result, no templates will be generated based on difference data analyzing circuit 238 analyzing the difference pixel pattern image 650.

The exemplary embodiments of the template-based filter design systems and methods of the invention, as described above, describe a minimum threshold. That is, if a particular weighting is above the threshold, a template is generated as a result of the weighting. However, it should be recognized that the invention is not limited to using a threshold as a minimum value. Instead, for example, a maximum threshold may be used. That is, if a particular weighting is above a threshold value, then a template would not be generated based on that weighting.

The exemplary embodiment of the template-based filter design systems and methods of the invention, described above in conjunction with FIGS. 5–9, relates in particular to image restoration, which may be characterized as resolution enhancement. Resolution enhancement may employ a template matching process that transforms a binary bitmap into multiple bits per pixel, i.e., a bit-depth greater than 1, or a higher spatial sampling resolution, with the goal of improving the appearance of the resulting printed image. However, the template-based filter design systems and methods of this invention are not limited to resolution enhancement. In addition, other potential applications include halftoning applications, resolution conversion, appearance tuning, restoration, and restoration of text acquired with color scanners.

The template-based filter design systems and methods of the invention may be used in conjunction with halftoning applications. Halftoning applications may involve inputting a particular multi-plane binary pattern into a look-up table and outputting a specified grayscale value, or alternatively, inputting a specified grayscale value into a look-up table and outputting a particular binary pattern.

The template-based filter design systems and methods of the invention may be used in conjunction with a resolution conversion process. A resolution conversion process may be implemented to map an image in one resolution to form another image in a different resolution, e.g., 300 spots per inch (spi) to 600 spi. The resolution conversion process may be performed with or without attempting to enhance the appearance of the image.

Further, an appearance tuning process may be implemented using the template-based filter design systems and methods of the invention. For example, the digital darkness of an image may be controlled, i.e., a document bitmap may be mapped to an image to yield a printed image with a desired degree of darkness on a given printing device.

Restoration, and particularly restoration of text acquired using color scanners, may be used to insert probable contour information when mapping from a binary bitmap to a partial grayscale digital image, for example, in conjunction with the template-based filter design systems and methods of the invention. Further, the template-based filter design systems and methods of this invention may be used to implement resolution enhancement techniques for text/line art with colored foreground/background, as well as for cleaning scanned images, or image segmentation processes, for example.

Figure 10:
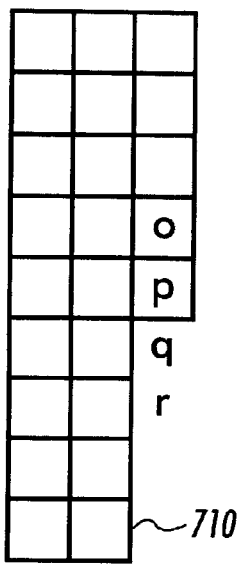
FIG. 10 is a diagram showing a jagged section of a line of an observed image in accordance with this invention.
Figure 11:
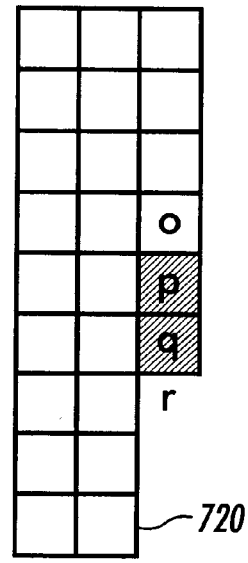
FIG. 11 is a diagram showing an enhanced section of line of an ideal image in accordance with this invention.

In accordance with a further exemplary embodiment of the template-based filter design systems and methods of the invention, the template-based filter generation system 200 addresses an image enhancement problem where the goal is to smooth jagged edges through the use of gray pixels. FIG. 10 shows a section of an angled line before image enhancement, i.e., an observed image 710. Further, FIG. 11 shows a section of an angled line after image enhancement, i.e., an ideal image 720. Thus, FIGS. 10 and 11 illustrate a situation where it is necessary or desirable to convert some of the four pixels along the jagged section in the observed image 710 to gray pixels, as shown in the ideal image 720.

In accordance with conventional techniques, a filter could have 4 templates in its look-up table to convert some of these four different types of pixels to gray pixels. However, cost constraints may not allow employment of all the templates that impart goodness to the final appearance of an image. Each of the 4 pixels o–r shown in FIG. 10 occurs an equal number of times for this type of line. Thus, using the conventional technique of equal weighting, it is difficult for an automated filter design system, for example, to decide which pixels and resulting templates are the most important relative to the desired image enhancement.

However, the template-based filter design systems and methods of the invention selectively choose which templates to include in the look-up table. For the type of problem illustrated by FIGS. 10 and 11, where pixels to be modified usually neighbor an ideal pixel, the distance function described above with respect to FIGS. 5–7 is not appropriate. Instead, a weighted sum of the nearest neighbors is more appropriate.

In accordance with the template-based filter design systems and methods of the invention, the observed image 710 and the ideal image 720 are each input into the template-based filter generation system 200. Specifically, the image analyzing circuit 232 inputs and stores pixel pattern data representing each of the observed image 710 and the ideal image 720 in the observed image memory 282 and the ideal image memory 286, respectively. The pixel value determining circuit 234 analyzes the stored pixel pattern data and stores the pixel pattern data in the form of vectors, for example, as described above. Specifically, the pixel value determining circuit 234 stores a vector representing the observed image 710 in the observed image pixel value memory 283. Also, the pixel value determining circuit 234 stores a vector representing the ideal image 720 in the ideal image pixel value memory 287. Further, as illustrated in this exemplary embodiment, the local image data analyzing circuit 230, for some applications, does not have to generate a difference pixel pattern image. Thus, for this application the difference model generating circuit 236 of the local image data analyzing circuit 230 may be omitted or disabled.

The difference data analyzing circuit 238 uses a specific protocol to analyze the observed image 710 vis-à-vis the ideal image 720. The difference data analyzing circuit 238 analyzes the ideal image 720 to determine which pixels, based on the pixel's properties in a neighborhood, should be turned to gray to optimize the visual perception. Thus, in accordance with this embodiment of the template-based filter design systems and methods of the invention, the difference data analyzing circuit 238 scans in each target pixel of the observed image 710, progressing from target pixel to target pixel. For each black target pixel, the difference data analyzing circuit 238 sums the neighboring white pixels, and ignores all the neighboring black pixels. For each white target pixel, the difference data analyzing circuit 238 sums the neighboring black pixels, and ignores all the neighboring white pixels.

Figure 12:
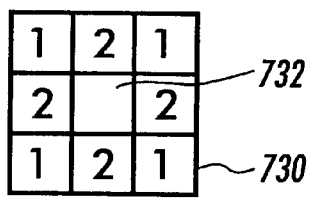
FIG. 12 is a diagram showing one exemplary weighted window in accordance with this invention.

The difference data analyzing circuit 238 uses a weighted mask to appropriately weight each of the neighbor pixels, which are in the neighborhood of the selected target pixel. Illustratively, the difference data analyzing circuit 238 uses the 3×3 neighborhood mask 730 shown in FIG. 12. The mask 730 includes a target pixel 732. The mask 730 possesses the weights:

1 2 1

2 TP 2

1 2 1 where TP represents the target pixel.

The difference data analyzing circuit 238 analyzes each of the pixels o–r in the observed image 710, as shown in FIG. 10, using the weighted mask 730. In particular, for ideal pixels that are black, the neighboring black pixels are given image values of "0", while the neighboring white pixels are given image values of "1" for the weighting process. In contrast, for ideal pixels that are white, neighboring black pixels are given image values of "1", while neighboring white pixels are given image values of "0" for the weighting process. As a result, ignoring the target pixel in each case, the pixels o–r have the following respective weights $W_n$, where n=o to r:

$$W_o = \begin{matrix} 1(0) + 2(0) + 1(1) + \\ 2(0) + \qquad 2(1) + \\ 1(0) + 2(0) + 1(1) \end{matrix} = 4$$

$$W_p = \begin{matrix} 1(0) + 2(0) + 1(1) + \\ 2(0) + \qquad 2(1) + \\ 1(0) + 2(1) + 1(1) \end{matrix} = 6$$

$$W_q = \begin{matrix} 1(1) + 2(1) + 1(0) + \\ 2(1) + \qquad 2(0) + \\ 1(1) + 2(0) + 1(0) \end{matrix} = 6$$

$$W_r = \begin{matrix} 1(1) + 2(0) + 1(0) + \\ 2(1) + \qquad 2(0) + \\ 1(1) + 2(0) + 1(0) \end{matrix} = 4$$

Based on the weights generated using the weighted mask 730 and the image values for neighboring pixels based on the image value of the target pixel, the difference data analyzing circuit 238 selects templates based on the degraded patterns most necessary or desirable to be fixed or changed. In this example, the difference data analyzing circuit 238 looks for select pixels in the observed image 710 that should be converted to grayscale pixels. To this end, for example, the threshold weight $W_t$ may be 5. Thus, if the difference data analyzing circuit 238 observes a degraded pixel in the observed image 710 that generates a weight greater than 5, the difference data analyzing circuit 238 generates an appropriate template to remedy that error. The difference data analyzing circuit 238 stores the appropriate template in the filter template memory 289.

Thus, since each of the p-pixel and the q-pixel generated a weight greater than 5, the difference data analyzing circuit 238 will generate a template to map the target pixel pattern observed in the observed image 710 to a more desirable pattern. That is, the difference data analyzing circuit 238 will create a template to map the p-pixel to a grayscale pixel. Also, the difference data analyzing circuit 238 will create a template to map the q-pixel to a grayscale pixel. The difference data analyzing circuit 238 will not create a template-based on either the observation of the o-pixel or the r-pixel.

Thus, the template-based filter generation system 200 of the invention using the weighted mask 730 allows the appropriate cost cutting decision, for example, to be made. Accordingly, if half as many templates were allowed in the final look-up table, the template-based filter generation system 200 could effectively choose templates to identify pixels p and q, rather than pixels o and r.

Accordingly, the template-based filter design systems and methods of this invention provide methods to improve the filter design process in a manner that yields filtered output more optimized for visual considerations. Furthermore, concerning design of cost-reduced filters, the template-based filter design systems and methods of the invention allow for a wiser decision to be made when reducing the total number of templates allowed in the filter. These improvements are achieved by weighting "difference pixels" by a factor associated with the surrounding image structure.

Possible weighting schemes in accordance with the template-based filter design systems and methods of the invention include a function of the distance to ideal pixels and a function of the value of neighboring pixels, as described above. Other weightings are also possible, for example, for an image enhancement application with appearance tuning considerations, it may be more appropriate to turn black difference pixels to gray more often than to turn white difference pixels to gray. Thus, the template-based filter design systems and methods of the invention can design an enhancement/tuning filter by weighting the black difference pixels by a larger amount than the white pixels.

In accordance with the systems and methods of the invention, it should be recognized that the weighting associated with observed pixels may be generated in a variety of manners. Illustratively, a given template may be characterized as possessing an average performance over the pixels that the template modifies. The weighting may be based on this average performance. Accordingly, a template may be included in a filter if the average weight of the pixels that the template changes is 5, for example.

Further, it should be recognized that changing pixels that already have a correct value would figure negatively into the average performance. Accordingly, when designing the template based filter, i.e., in the training of the filter, an error pixel may have a weight of some sign, and pixels that are already correct may have weights of the opposite sign, for example. It should be recognized that a filter can change any pixel to which a template in the filter fits. Under some circumstances, it may be inappropriate for the template to perform a change. In that case the filter may be said to incur an error. Thus, it may be necessary or desirable to minimize such an error in the filter. Thus, in accordance with the systems and methods of the invention, a bad or degraded pixel may be weighted by how much the bad or degraded pixel should be changed. Also, a good pixel may be weighted by how much the good pixel should not be changed.

In accordance with the systems and methods of the invention, it should be understood that each of the circuits shown in FIGS. 2 and 3 can be implemented as portions of a suitably programmed general purpose computer. Alternatively, each of the circuits shown in FIGS. 2 and 3 can be implemented as physically distinct hardware circuits within an ASIC, or using a FPGA, a PDL, a PLA or a PAL, or using discrete logic elements or discrete circuit elements. The particular form each of the circuits shown in FIGS. 2 and 3 will take is a design choice and will be obvious and predicable to those skilled in the art.

Figure 13:
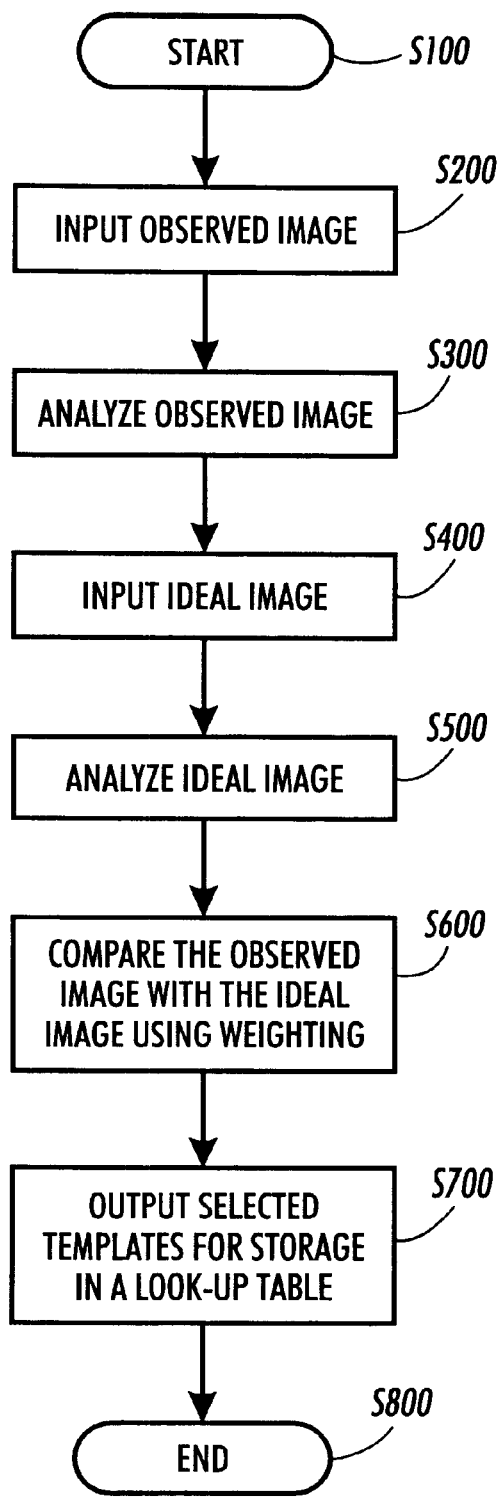
FIG. 13 is a flowchart outlining one exemplary embodiment of a method for designing a template-based filter in accordance with this invention.

FIG. 13 is a flowchart outlining one exemplary embodiment of a template-based filter design method according to this invention. As shown in FIG. 13, the design process begins in step S100, and continues to step S200, where an observed image is input. Then, in step S300, the observed image is analyzed. Next, in step S400, the ideal image is input. Control then passes to step S500. In step S500, the ideal image is analyzed. The observed image and the ideal image constitute a pair of training images. Next, in step S600, the observed image is compared with the ideal image using a window and by appropriately weighting the pixels within the window. Then, in step S700, the templates selected in step S600 are output for storage in a look-up table or used to generate a Boolean logic circuit. Finally, in step S800, the design process ends.

Figure 14:
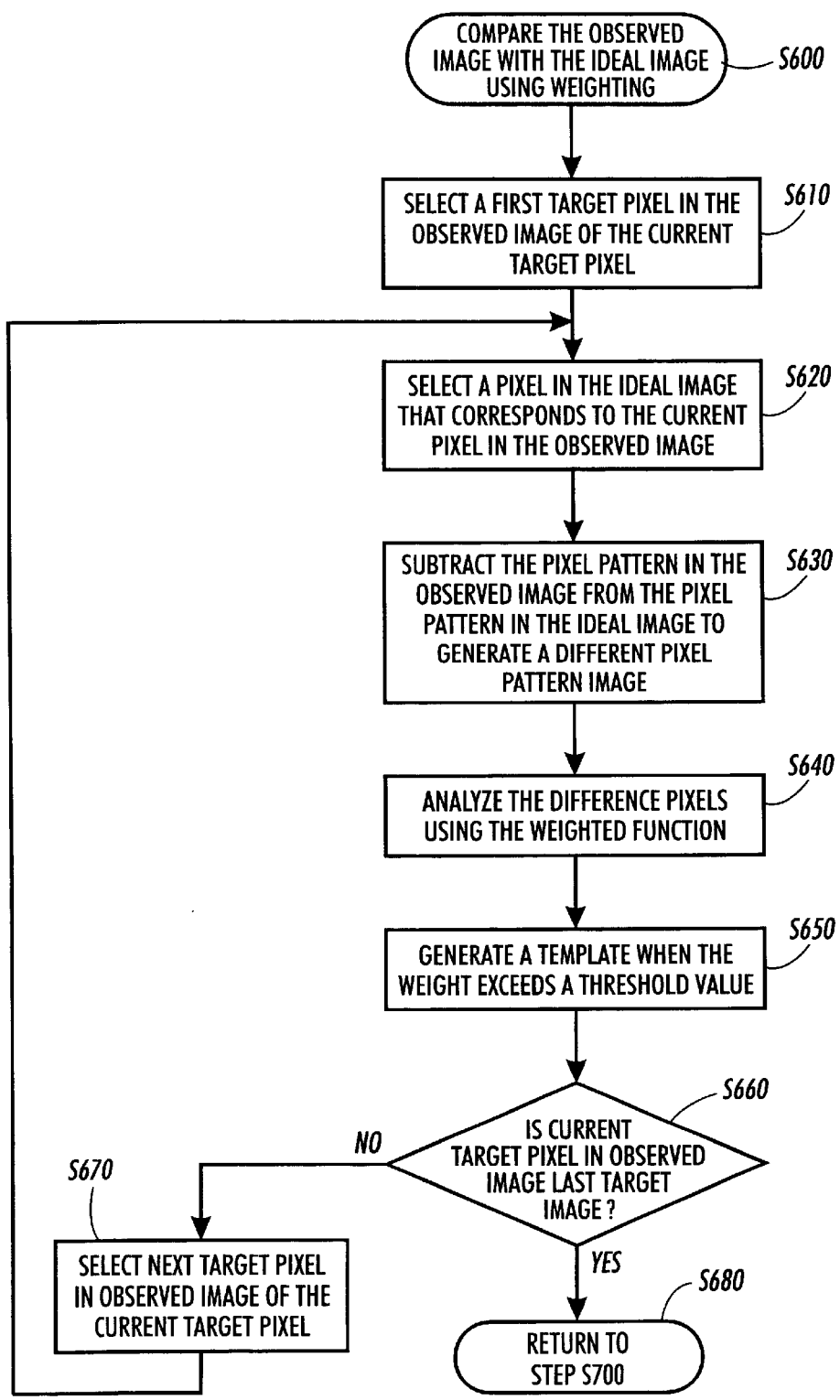
FIG. 14 is a flowchart outlining in greater detail one exemplary embodiment of comparing the observed image with the ideal image step of FIG. 13 in accordance with this invention.

FIG. 14 is a flowchart outlining in greater detail one exemplary embodiment of comparing the observed image with the ideal image in step S600. Beginning in step S600, control continues to step. S610, where a first target pixel in the observed image is selected as the current target pixel in the observed image using an appropriately selected window for the particular filter being designed. Then, in step S620, a pixel in the ideal image that corresponds to the current target pixel in the observed image is selected as the ideal target pixel using the appropriately selected window.

Next, in step S630, the pixel pattern occurring in the appropriately-selected window for the current target pixel in the observed image is subtracted from the corresponding pixel pattern occurring in the appropriately-selected window for the ideal target pixel in the ideal image. As a result of this subtraction process, a difference pixel pattern image is generated. Control then continues to step S640.

In step S640, the difference pixels in the difference pixel pattern image are analyzed using an appropriately-selected window for the particular filter being designed and an appropriate weighted function for the filter being designed. Then, in step S650, a template is generated when the weight determined in step S640 exceeds a predetermined threshold value, where the particular threshold value is selected based on the filter being designed. Control then continues to step S600.

In step S660, a determination is made whether the current target pixel in the observed image is the last target pixel. If not, then control continues to step S670. Otherwise, control jumps to step S680. In step S670, the next target pixel in the observed image is selected as the current target pixel. Control then returns to step S620. Once the current target pixel of the observed image is the last pixel in step S660, then, in step S680, control returns to step S700.

The template-based filter generation system 200 shown in FIGS. 2 and 3 is preferably implemented on a programmed general purpose computer. However, the template-based filter generation, system 200 shown in FIGS. 2 and 3 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 13 and 14, can be used to implement the image template-based filter generation system 200.

While this invention has been described in conjunction with specific embodiments outlined above, it is evident that many alternative modifications and variations may be apparent to those skilled in the art. Accordingly, the exemplary embodiments of the invention as set forth herein are intended to be illustrative, not limiting. Various changes may be made without departing from the spirit and scope of the invention.

What is claimed is:

1. A method for creating a template-based filter for converting an observed image to a filtered image based on ideal filtered image data, the observed image having a plurality of pixels arranged in at least a two-dimensional array, the method comprising:

selecting at least one of the plurality of pixels in the observed image;

determining, for each selected pixel, pixel parameter information in the observed image;

weighting at least one parameter associated with the pixel parameter information to generate a weighted value; and determining whether to create a template based on the magnitude of the weighted value.

2. The method according to claim 1, wherein the ideal filtered image data is an ideal filtered image.

3. The method according to claim 2, the method further comprising:

selecting at least one of a plurality of pixels in the ideal filtered image, the ideal filtered image having a plurality of pixels arranged in at least a two-dimensional array;

determining, for each selected pixel, pixel parameter information in the ideal filtered image;

comparing the pixel parameter information in the observed image with the pixel parameter information in the ideal filtered image to determine the weighted parameter.

4. The method according to claim 3, wherein the weighted parameter is a difference value between the pixel parameter information of the observed image and the pixel parameter information of the ideal filtered image.

5. The method according to claim 2, wherein determining the pixel parameter information in the observed image includes:

determining an ideal edge; and determining the distance between the selected pixel and the ideal edge;

wherein the weighted parameter is the distance between the selected pixel and the ideal edge.

6. The method according to claim 5, wherein the weighting is based on the relationship:

$$w=d^n,$$

where:

w is the weighted value;

d is the distance between the selected pixel and the ideal edge; and n is an integer.

7. The method according to claim 6, wherein weighting the at least one parameter comprises:

assigning a correct pixel in the observed image a positive weight;

assigning an incorrect pixel in the observed image a negative weight; and summing the negative weights and the positive weights.

8. The method according to claim 6, wherein n=2.

9. The method according to claim 2, wherein:

selecting at least one of the plurality of pixels includes observing a portion of the observed image; and weighting the at least one parameter includes determining a weighted average over the observed portion of the observed image.

10. The method according to claim 1, wherein determining whether to create a template based on the magnitude of the weighted value includes:

comparing the magnitude of the weighted value with a threshold value; and creating a template if the magnitude of the weighted value is greater than the threshold value.

11. The method according to claim 1, wherein:

determining, for each selected pixel, pixel parameter information in the observed image includes determining properties of neighboring pixels in a neighborhood proximate the selected pixel; and weighting at least one parameter associated with the pixel parameter information includes assigning each neighboring pixel one weighted value from a weighted values group, the weighted values group including at least two weighted values.

12. The method according to claim 11, wherein the weighted value assigned to each of the neighboring pixels is determined based on the spatial location of each of the respective neighboring pixels to the selected pixel.

13. The method according to claim 12, wherein determining properties of neighboring pixels in the neighborhood proximate the selected pixel includes using a weighted observation window.

14. The method according to claim 13, wherein the weighted observation window is a 3×3 weighted observation window, the selected pixel is a target pixel TP at the center of the weighted observation window at the coordinates (1,1), and the neighboring pixels are weighted according to the following weighting scheme:

1 2 1

2 TP 2

1 2 1.

15. The method according to claim 1, wherein the pixel parameter information represents the pixel pattern of a neighborhood associated with each selected pixel.

16. The method according to claim 1, wherein the pixel parameter information is in the form of as vector.

17. The method according to claim 1, further comprising selecting at least one of the observed image and the ideal filtered image data.

18. The method according to claim 17, wherein selecting at least one of the observed image and the ideal filtered image data includes selecting both of the observed image and the ideal filtered image data.

19. The method according to claim 17, wherein selecting at least one of the observed image and the ideal filtered image data includes:

selecting an ideal filtered image; and converting the ideal filtered image to the observed image using a conversion process.

20. A filter generating system that generates a template based filter capable of converting an observed image to an ideal image comprising:

a pixel value determining circuit that analyzes the observed image and generates pixel parameter data based on the analysis of the observed image;

a difference model generating circuit that determines difference data between the observed image and the ideal image based on the pixel parameter data; and a difference data analyzing circuit that analyzes the difference data using weights, the difference data analyzing circuit determining whether to generate templates based on the analysis of the difference data.

21. The filter generating system according to claim 20, wherein;

the difference data analyzing circuit generates a weighted value; and the difference data analyzing circuit compares the weighted value with a threshold value to determine whether to generate a template.

* * * * *